United States Patent [19]

Vongehr

[11] Patent Number: 5,751,566
[45] Date of Patent: May 12, 1998

[54] CURRENT STABILIZER WITH STEP-UP TRANSFORMER

[75] Inventor: Otto Vongehr, Aldersbach/Bundesrepublik, Germany

[73] Assignee: Siemens Aktiengesellschaft, Munich, Germany

[21] Appl. No.: 666,449

[22] PCT Filed: Dec. 22, 1994

[86] PCT No.: PCT/DE94/01529

§ 371 Date: Jun. 24, 1996

§ 102(e) Date: Jun. 24, 1996

[87] PCT Pub. No.: WO95/17707

PCT Pub. Date: Jun. 29, 1995

[30] Foreign Application Priority Data

Dec. 23, 1993 [DE] Germany ............... 43 44 286.2

[51] Int. Cl.[6] ............................................. H02M 3/335
[52] U.S. Cl. ......................... 363/71; 363/17; 363/134; 315/279
[58] Field of Search .................. 363/23, 25, 26, 363/61, 65, 71, 100, 134, 17, 56, 98, 21, 97; 315/137, 141, 144, 160, 246, 276, 279, 307, 219; 323/234, 247, 259

[56] References Cited

U.S. PATENT DOCUMENTS

| | | | |
|---|---|---|---|
| 3,295,053 | 12/1966 | Perrins | 323/22 |
| 3,440,519 | 4/1969 | Macemon | 323/6 |
| 3,743,921 | 7/1973 | Legg et al. | 323/4 |
| 4,386,311 | 5/1983 | Bafaro | 323/271 |
| 4,517,472 | 5/1985 | Ruitberg et al. | 307/82 |
| 4,733,158 | 3/1988 | Marchione et al. | 323/258 |
| 4,853,832 | 8/1989 | Stuart | 363/17 |
| 4,965,508 | 10/1990 | Soan | 323/239 |
| 5,189,599 | 2/1993 | Messman | 363/21 |
| 5,610,452 | 3/1997 | Shimmer et al. | 307/89 |

FOREIGN PATENT DOCUMENTS

| | | |
|---|---|---|
| 0 335 626 | 10/1989 | European Pat. Off. |
| 1 469 154 | 4/1967 | France. |
| 2 353 168 | 12/1977 | France. |
| 2 406 908 | 3/1979 | France. |
| 10 44 964 | 11/1958 | Germany. |
| 14 88 269 | 2/1969 | Germany. |
| 34 22 961 | 12/1985 | Germany. |
| 1 034 554 | 6/1966 | United Kingdom. |

*Primary Examiner*—Adolf Berhane
*Attorney, Agent, or Firm*—Kenyon & Kenyon

[57] ABSTRACT

Constant-current regulators are required, for example, in systems for airfield lighting and have units for nominal-value presetting and actual-value detection as well as for actual value/nominal value comparison. According to the present invention, a constant-current regulator having a step-up transformer is designed in such a manner that the primary of the step-up transformer is assigned a unit for selection of a basic voltage, and in such a manner that a switch-mode regulator module supplies a power which is applied to the basic voltage.

10 Claims, 2 Drawing Sheets

CURRENT STABILIZER WITH STEP-UP TRANSFORMER

FIELD OF THE INVENTION

The present invention relates to a lighting system which includes a constant-current regulator. The system of the present invention is particularly applicable to airfield lighting.

BACKGROUND INFORMATION

Constant-current regulators are required in widely different fields of technology. Particularly when lighting systems have to be operated at a defined and constant brightness, such as in the case of airfield lighting systems but also in lighting systems for theaters and television studios, stringent requirements are placed on a current intensity or voltage which are constant with respect to time and with comparatively high electrical powers. However, the same also applies in principle to metallurgy, for example, when operating furnaces which are operated at high power. A regulator which is described in the French Patent Application No. 14 69 154 can be used, for example, for such applications.

Particularly in the case of systems for airfield lighting, groups of lighting elements are in each case operated at a constant current intensity via series transformers. In such a case, the individual lighting elements are connected in series via "lamp transformers". If a lighting element fails, the associated lamp transformer is controlled to saturation.

Conventional constant-current regulators for such applications operate on the basis of the required electrical powers with thyristor circuits. U.S. Pat. No. 3,743,921 describes a system having a large number of lighting elements in a secondary circuit which are intended to be operated at the same brightness. A device which monitors and adjusts the triggering point of the individual thyristors is required for the regulator circuit using thyristors. The known principle of phase-gating control is used, and the primary of the series transformer is supplied with the required power via the thyristor circuit. The required actual value/nominal value comparison is in each case performed using an ammeter on the secondary side and feedback to the primary, with a nominal-value transmitter for the purpose of activation of the regulator.

SUMMARY OF THE INVENTION

An object of the present invention is to provide an improved system for lighting an airfield. The object is achieved according to the present invention, in that a power which is applied to the basic voltage is produced by means of a separate winding of the step-up transformer or of a separate transformer having a primary winding and a secondary winding, and in that a switch-mode regulator module regulates only the power which is applied to the basic voltage. Thus, the switch-mode regulator module drives the primary winding element of the step-up transformer or of the separate transformer having a primary and secondary winding. The primary windings are driven using a transistor circuit.

The system according to the present invention includes a constant-current regulator having a step-up transformer with units for nominal-value presetting and actual value detection and for actual value/nominal value comparison, the primary of the step-up transformer being assigned the unit for selection of a basic voltage.

According to the present invention, the means for actual value/nominal value comparison are preferably digital switching means. The switch-mode regulator module can now advantageously drive the primary winding of the step-up transformer directly using a transistor circuit since only comparatively low powers, e.g., 5 to 20% of the total power, are regulated.

With the present invention, it is particularly advantageous that virtually no harmonics are fed back into the power supply. In contrast to known systems, no inductor is absolutely essential for the series transformer. The charging of the cable capacitance is carried out by means of a sinusoidal current so that the previously observed resonance phenomena in the current no longer occur.

The constant-current regulator according to the present invention is preferably designed so that the regulator output stage is designed, e.g., for about only one-tenth of the total power. As a result, only approximately one-tenth of the power loss is incurred. Accordingly, 10% less current, at most, occurs in the series circuit in the event of a regulator failure.

Thus, only one regulator is required for low powers. Where high powers are present, a plurality of regulators designed according to the present invention can advantageously be connected in parallel.

DETAILED DESCRIPTION

Figure 1:
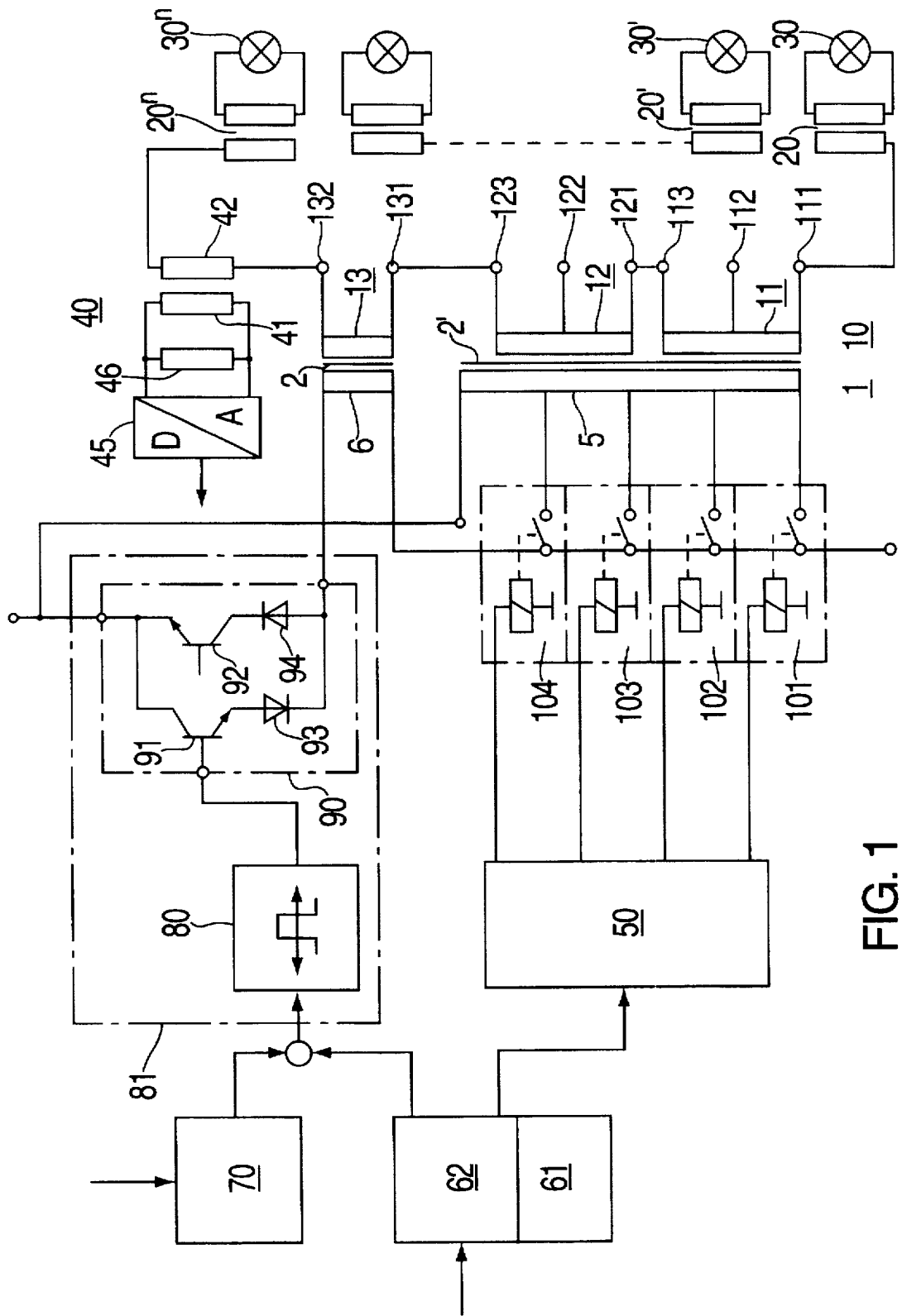
FIG. 1 shows the circuit of a regulator according to the present invention.

FIG. 1 shows a series transformer whose primary has at least one winding 1 and whose secondary has an arrangement 10 composed of a plurality of winding elements. In between, there is a metal yoke 2 or 2', with electrical metal sheets. In detail, for example, primary windings 5 and 6 as well as secondary windings 11, 12 and 13 are illustrated, with respective outputs 111 to 113, 121 to 123 and 131 and 132, respectively.

The arrangement is intended to be used, e.g., for an operation of an airfield lighting system. The transformer 1, 2, 10 forms either a unit with a single yoke or may comprise two separate transformers with the primaries connected in parallel and the secondaries in series, as can be seen in FIG. 1.

Groups of lighting elements 30, 30', . . . , 30'' are in each case connected to the outputs. Each lighting element 30 has a lamp transformer 20, 20', . . . , 20'' assigned to it. It is an important consideration, in air lighting systems, that a constant brightness of all elements is ensured in the event of power supply fluctuations which may be on the order of magnitude of 10 to 15%. Suitable regulation of the input voltage of the transformer 1, 2, 10 is required for such purpose.

In FIG. 1, an actual-value transmitter 40 is shown which comprises a current transformer having two windings 41 and 42 and a downstream A/D converter 45 with an associated resistor 46. Actual-value signals are fed back in digital or analog form, via the A/D converter 45, to the regulator on the primary side of the transformer 1, 2, 10.

The regulator comprises a control loop with associated control units, by means of which the primary of the transformer 1, 2, 10 is driven. The winding 5 is assigned a unit 50 for coarse step selection. This unit 50 allows the basic power for the transformer 1, 2, 10 to be preset in coarse steps, to be precise via relays, contactors or semiconductor switches 101 to 104 which are connected to the primary winding 5. The unit for step selection 50 is activated via a device 60 having a digital or analog drive unit 61 and an associated nominal-value unit 62. Both units 61 and 62 can be driven by a standard bus system. Alternatively, a single-wire drive is possible.

Thus, while the basic voltage for the primary is preset as defined by the step selection unit 50 and, depending on the requirement, implements for example about 90% of the basic power, approximately 10% of the power is added and is connected to a winding element 6 on the primary side of the step-up transformer 1, 2, 10. For this purpose, the actual value is passed from the actual-value transmitter 40 to a unit 70. The actual value of the unit 70 and the nominal value of the unit 62 are subjected to an actual value/nominal value comparison and pass together into a switch-mode regulator module 80. Regulated by the actual value/nominal value comparison, the switch-mode regulator module 80 produces, for example, control pulses which are connected via a transistor circuit 90 to the primary circuit 1, on the coil element 6.

The transistor circuit 90, in detail, may comprise, for example, MOSFETs or else bipolar transistors. Transistors 91 and 92 and reverse-connected diodes 93 and 94 are shown, by way of example. A transistor circuit according to the present invention is advantageous since only comparatively small powers must be regulated out. The switch-mode regulator module 80 and the transistor circuit 90 can both be replaced by a commercially available regulator with a transistor circuit.

The circuit shown in FIG. 1 is part of a complete airfield lighting system which may also contain diagnostic equipment. The equipment includes units for lamp failure signaling (so-called LAM modules) and for insulation measurement (so-called ISO modules). Such modules are in principle already known from the prior art.

Figure 2:
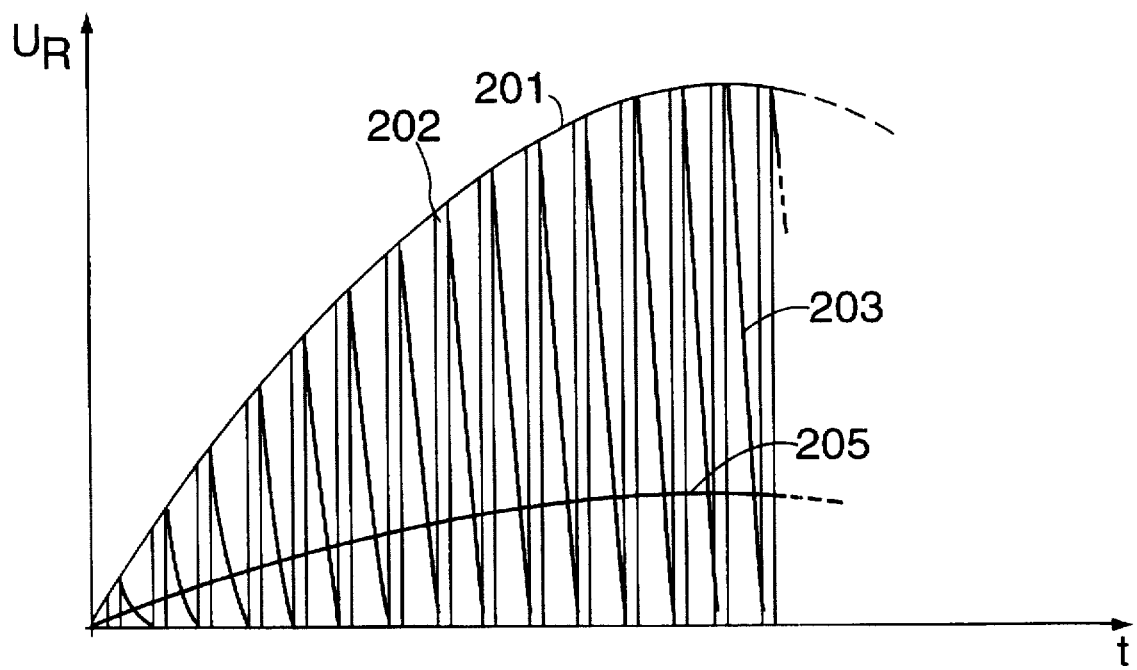
FIG. 2 shows a graph of voltages which are generated on the step-up transformer using the regulator according to FIG. 1.

FIG. 2 shows a graph of partial voltage profiles. In detail, 201 shows, as an envelope, the input voltage for the step-up transformer 1, 2, 10. In this case, the voltage 202 is present on the transistor circuit 90 as amplitude-modulated pulses, in each case governed by the switch-mode regulator module 80. If an inductor were used, the voltage pulses 202 would in each case be rounded corresponding to the signals 203. An output voltage corresponding to the envelope 205 then results on the secondary side.

Figure 3:
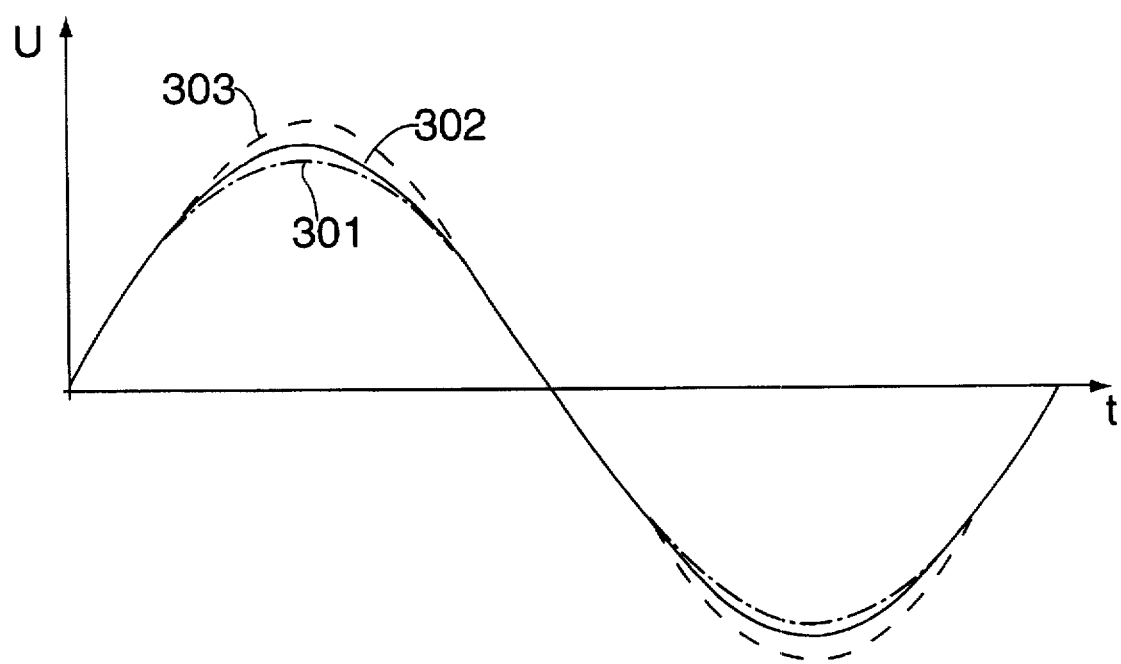
FIG. 3 shows a graph of associated output voltages over one cycle.

FIG. 3 relates to the method of operation of the circuit according to FIG. 1. Curve 301 shows the basic voltage to which, corresponding to curve 302, an output voltage is applied at $U_N$. If an undervoltge on the order of magnitude of, for example, 15% or a lamp failure occurs, the voltage is increased corresponding to the curve 303. In the event of overvoltage or failure of the regulator, the profile corresponding to the original curve 301 results.

Using the arrangement according to the present invention, signal transmission is advantageously possible in the vicinity of the zero crossing of the voltage. This applies in particular to the LAM module or to other types of switching operations. It is particularly advantageous that the resulting current is not the current with gaps as has been normal until now in the case of thyristor gating controllers, but a sinusoidal current, or at least approximately sinusoidal current, is always produced in the vicinity of the zero crossing.

As a result of the defined zero crossing, data can be transmitted with less interference than in the past. As already mentioned, in the case of airfield lighting systems, such data may include information relating to lamp failure or to individual or group switching operations for the individual lighting units of the system. Such data transmission is used in particular in the case of an improved taxiway management system. In the past, this was done via a separate bus system, which can now be dispensed with.

What is claimed is:

1. In a lighting system a constant-current regulator comprising:

a first unit for selecting a basic voltage;

a step-up transformer including a first primary winding coupled to the first unit, wherein an additional power for supplementing the basic voltage is produced using one of a second primary winding of the step-up transformer and a second transformer which includes the second primary winding and a secondary winding;

a switch-mode regulator module for regulating the additional power, wherein the switch-mode regulator module drives the second primary winding; and a drive circuit by which the switch-mode regulator module drives the second primary winding.

2. The system according to claim 1, wherein the basic voltage provides approximately 90% of the power, and wherein approximately 10% of the power is provided to the second primary winding.

3. The system according to claim 1 comprising a second unit for presetting a nominal value, wherein the second unit activates the first unit.

4. The system according to claim 1 comprising a third unit for detecting an actual value, the third unit being an analog current transformer.

5. The system according to claim 4, further comprising an A/D converter coupled to a resistor, the A/D converter positioned downstream from the analog current transformer for generating a digital representation of the actual value.

6. The system according to claim 1, further comprising a digital switching means for comparing an actual value and a nominal value.

7. The system according to claim 1, wherein the transistor circuit includes MOSFETs and respective reverse-connected diodes.

8. The system according to claim 1, wherein the transistor circuit includes bipolar transistors.

9. The system according to claim 1, wherein the switch-mode regulator module and the transistor circuit form a driving regulator, the driving regulator driving the first primary winding of the first step-up transformer.

10. The system according to claim 1, wherein the step-up transformer allows substantially interference-free data transmission in a region of a voltage zero crossing.

* * * * *